US012809664B2

(12) United States Patent
Pandya et al.

(10) Patent No.: US 12,809,664 B2
(45) Date of Patent: Nov. 24, 2026

(54) DISTRIBUTION COMPUTER NETWORK WITH MULTIPLE INTERACTION DATA TYPES

(71) Applicant: Wesco Digital Solutions (Ireland) Limited, Dublin (IE)

(72) Inventors: Raja Vikram Raj Pandya, Katy, TX (US); Shashi Dande, Spring, TX (US); Arjun Srinivasan, Cypress, TX (US); Shreyas Bhat, Saint Johns, FL (US); Kishor Saitwal, Sugar Land, TX (US); Vivek Nayak, Dublin (IE)

(73) Assignee: Wesco Digital Solutions (Ireland) Limited, Dublin (IE)

( * ) Notice: Subject to any disclaimer, the term of this patent is extended or adjusted under 35 U.S.C. 154(b) by 0 days.

(21) Appl. No.: 19/393,247

(22) Filed: Nov. 18, 2025

(65) Prior Publication Data

US 2026/0072732 A1 Mar. 12, 2026

Related U.S. Application Data

(63) Continuation of application No. PCT/EP2024/065127, filed on May 31, 2024.

(51) Int. Cl.
*G06F 9/48* (2006.01)
*G06F 21/62* (2013.01)

(52) U.S. Cl.
CPC .......... *G06F 9/485* (2013.01); *G06F 21/6218* (2013.01)

(58) Field of Classification Search
CPC ........................................................ G06F 9/485
See application file for complete search history.

(56) References Cited

U.S. PATENT DOCUMENTS 10,791,168 B1 9/2020 Dilley et al.
11,902,248 B2 2/2024 Moghe et al.
12,596,693 B2 * 4/2026 Alfaras ................ G06F 16/215
(Continued)

FOREIGN PATENT DOCUMENTS

CN 111164952 A 5/2020

OTHER PUBLICATIONS

International Search Report for corresponding PCT/EP2024/065127 dated Dec. 23, 2024.

*Primary Examiner* — Lewis A Bullock, Jr.
*Assistant Examiner* — Kevin X Lu
(74) *Attorney, Agent, or Firm* — K&L Gates LLP

(57) ABSTRACT

A distribution computer network is disclosed. The distribution computer network includes a plurality of computer nodes, each configured to run a set of softwares with distinct data processing parameters, wherein at least one of the computer nodes being configured as an orchestration node and the remaining computer nodes being configured as task-oriented nodes, the orchestration node being configured, upon receiving instruction data to perform a task, and based on a set of extracted task parameters, to coordinate operation of the remaining computer nodes in the distribution network to execute the task. The distribution computer network may further include a rules database accessible by the computer nodes, the rules database comprising rules modifiable by the orchestration node to direct changes in the operation of at least one of the task-oriented nodes based on the task.

16 Claims, 9 Drawing Sheets

(56) References Cited

U.S. PATENT DOCUMENTS

| | | | | |
|---|---|---|---|---|
| 2015/0271296 | A1* | 9/2015 | Borzycki | G06F 21/53 709/202 |
| 2018/0373781 | A1 | 12/2018 | Palrecha | |
| 2021/0014113 | A1 | 1/2021 | Guim Bernat et al. | |
| 2022/0021652 | A1* | 1/2022 | Moghe | H04L 63/20 |
| 2022/0278911 | A1* | 9/2022 | Padala | H04L 41/083 |
| 2024/0098115 | A1* | 3/2024 | Dürr | H04L 67/1006 |
| 2024/0126615 | A1* | 4/2024 | Nadathur | G06F 11/3433 |
| 2025/0123894 | A1* | 4/2025 | Kirk | G06F 9/5038 |

* cited by examiner

DISTRIBUTION COMPUTER NETWORK WITH MULTIPLE INTERACTION DATA TYPES

CROSS-REFERENCES

This application is a by-pass continuation application under 35 U.S.C. § 1.11(a) of International Application No. PCT/EP2024/065127, filed on May 31, 2024, entitled "DISTRIBUTION COMPUTER NETWORK WITH MUTLIPLE INTERACTION DATA TYPES TECHNICAL FIELD," the entire disclosure of which is incorporated by reference herein.

TECHNICAL FIELD

The following disclosure relates generally to methods and systems for automatically processing interaction data and automatically generate and perform tasks in a distribution computer network.

BACKGROUND

In today's complex network environments, handling data presents a multifaceted challenge, encompassing the management, analysis, and interpretation of vast volumes of information. One of the primary complexities lies in the sheer scale of data generated from diverse sources. Moreover, the velocity at which data is generated adds another layer of complexity. Sophisticated networks need to process and analyze data and take appropriate actions for various tasks completion at unprecedented speeds to derive timely insights. In addition to volume and velocity, the variety of data formats poses a significant challenge, particularly in a complex network that processes interaction data from multiple, and different, sources.

SUMMARY

In some respects, the present disclosure combines specialized, or dedicated, computing with orchestrative computing within a distribution network to process interaction data from multiple, and different, sources. Advanced data integration techniques and flexible data models are utilized to integrate and harmonize these disparate data types to ensure efficient and reliable interactions across the distribution network.

In one aspect, a distribution computer network includes a plurality of computer nodes, each configured to run a set of softwares with distinct data processing parameters, wherein at least one of the computer nodes being configured as an orchestration node and the remaining computer nodes being configured as task-oriented nodes, the orchestration node being configured, upon receiving instruction data to perform a task, and based on a set of extracted task parameters, to coordinate operation of the remaining computer nodes in the distribution network to execute the task. The distribution computer network may further include a rules database accessible by the computer nodes, the rules database comprising rules modifiable by the orchestration node to direct changes in the operation of at least one of the task-oriented nodes based on the task. Furthermore, one or more of the computer nodes may infer one or more tasks based on the received instruction data and/or communication data from one or more external entities.

In another aspect, a method is executable by a distribution computer network with computer nodes. The method includes configuring one of the computer nodes as an orchestration node, receiving instruction data to perform a task, and extracting task parameters based on the task. The method further includes configuring the remaining computer nodes as task-oriented nodes with distinct data processing parameters based on the task parameters, and coordinating, by the orchestration node, operation of the task-oriented nodes to execute the task.

In yet another aspect, a distribution computer network includes computer nodes each configured to run a set of softwares with distinct data processing parameters. The computer nodes include first specialized nodes configured to process a first data type based on interactions with a first external data source, second specialized nodes configured to process a second data type based on interactions with a second external data source, and an orchestration node configured, upon receiving instruction data to perform a task, and based on a set of extracted task parameters, to coordinate operation of the first specialized nodes and the second specialized nodes to execute the task. The distribution computer network may further include a rules database accessible by the computer nodes, the rules database comprising rules modifiable by the orchestration node to direct changes in the operation of at least one of the first specialized nodes or the second specialized nodes based on the task.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
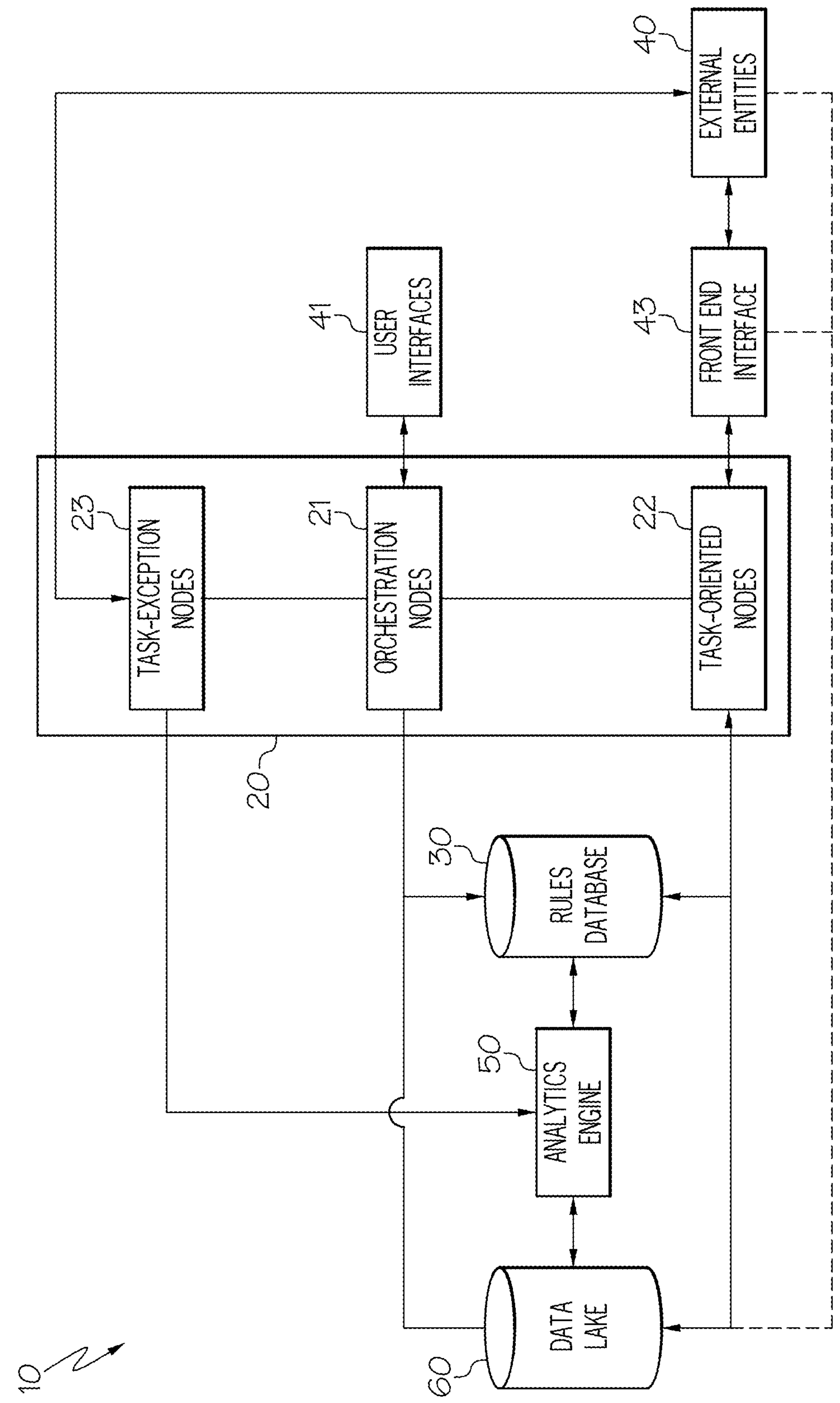

The systems and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a distribution computer network, according to at least one aspect of the present disclosure.

Figure 2:
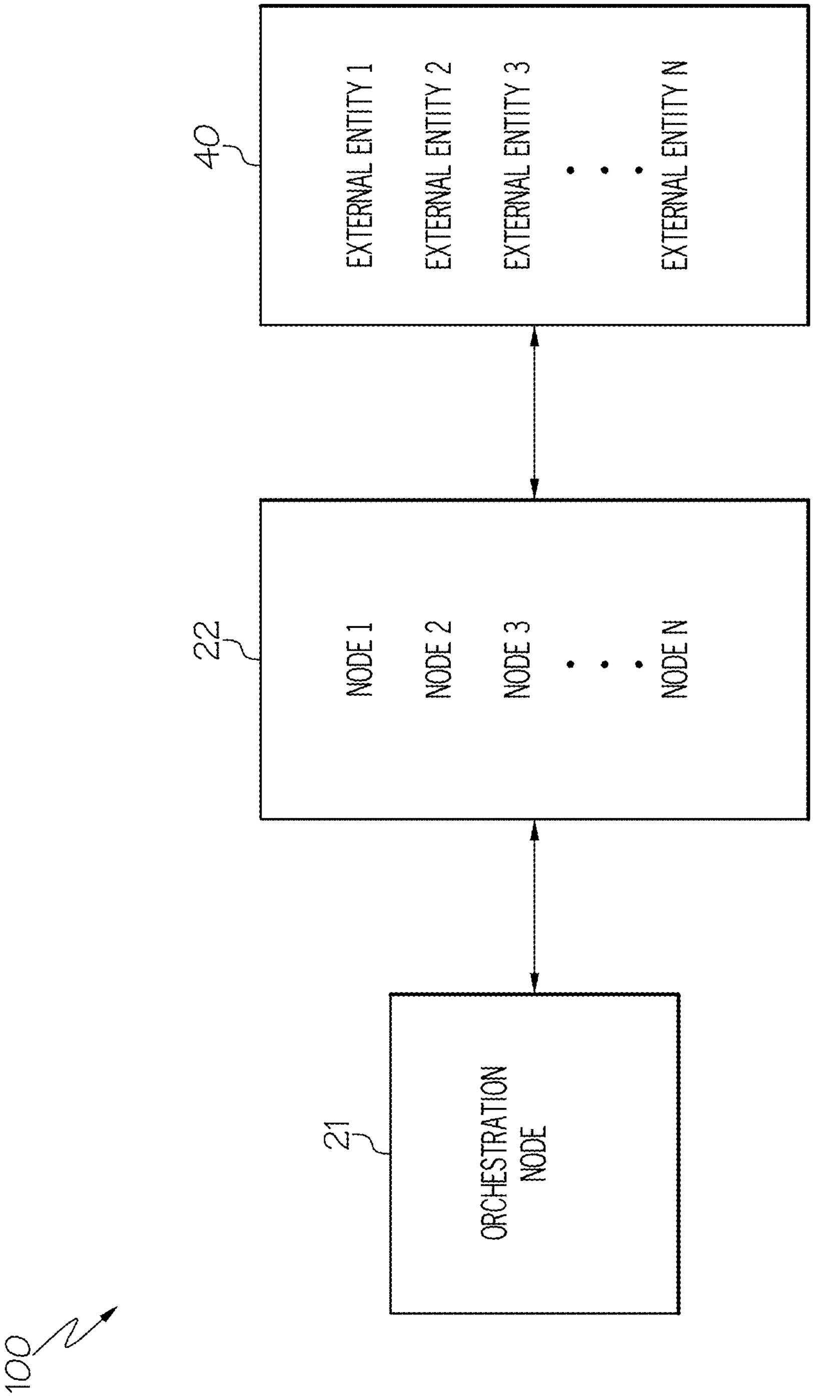

FIG. 2 illustrates a network architecture for use with the distribution computer network of FIG. 1.

Figure 3:
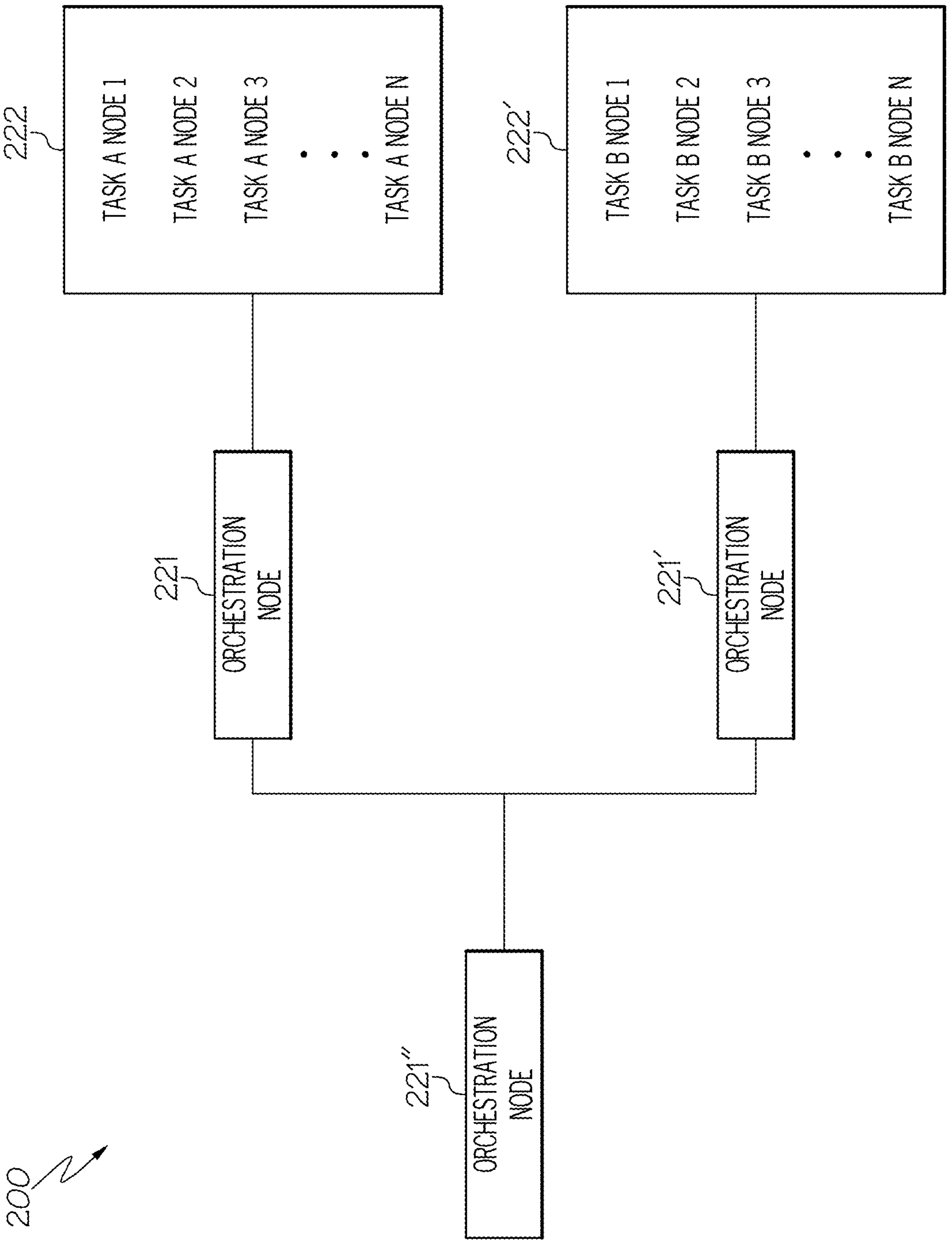

FIG. 3 illustrates a network architecture for use with distribution computer network of FIG. 1.

Figure 4:
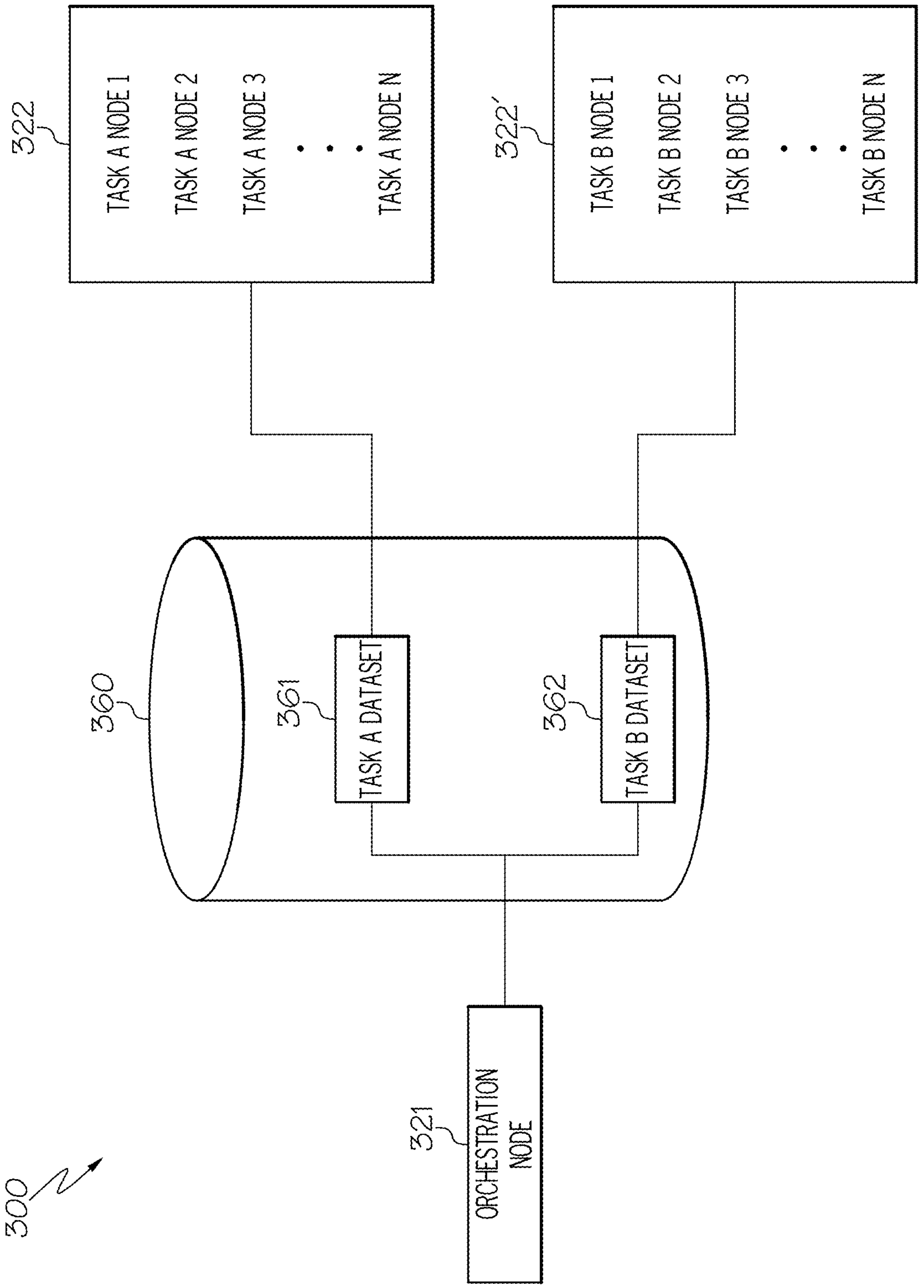

FIG. 4 illustrates a network architecture for use with distribution computer network of FIG. 1.

Figure 5:
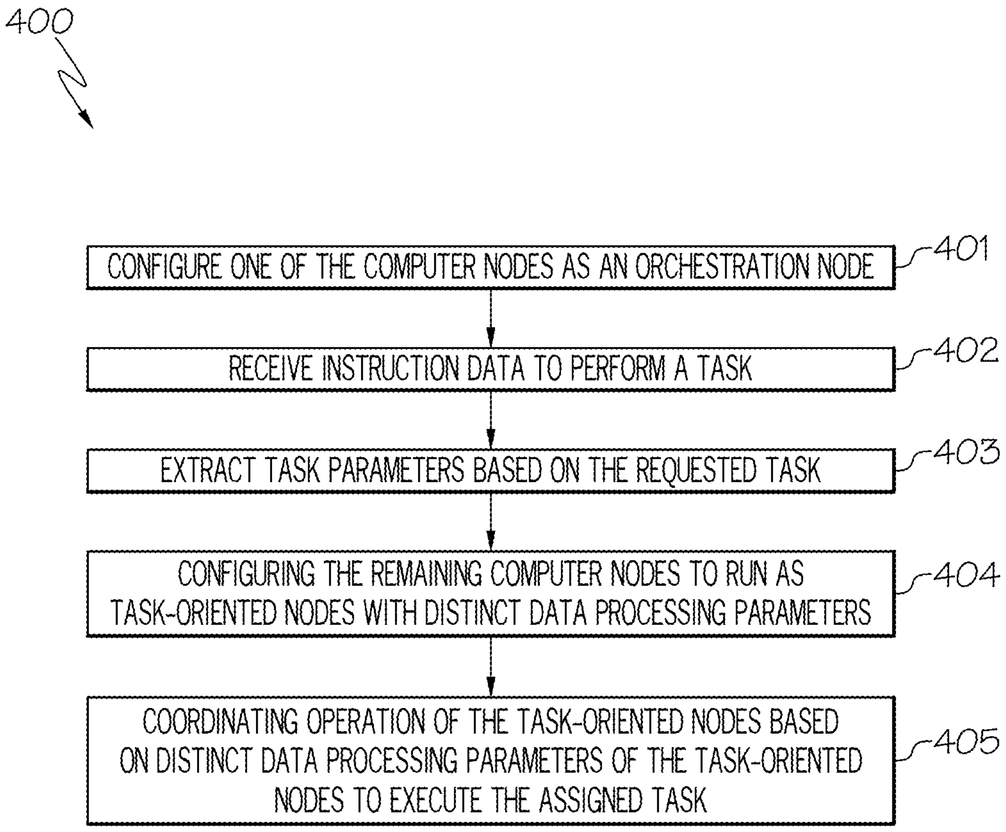

FIG. 5 is a method of processing interaction data, according to at least one aspect of the present disclosure.

Figure 6:
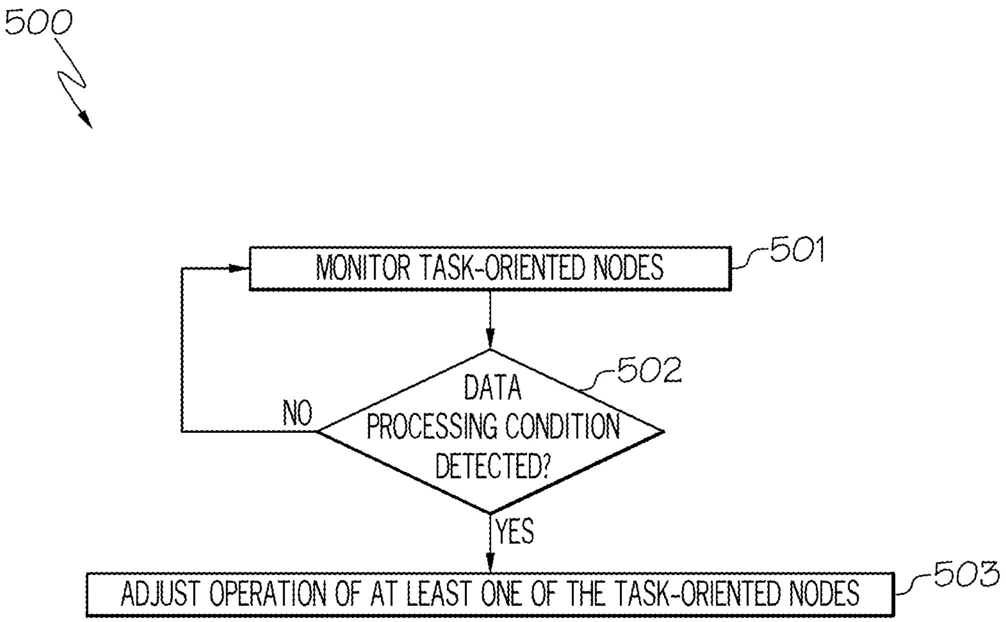

FIG. 6 is a method of coordinating, by an orchestration node, task-oriented nodes, according to at least one aspect of the present disclosure.

Figure 7:
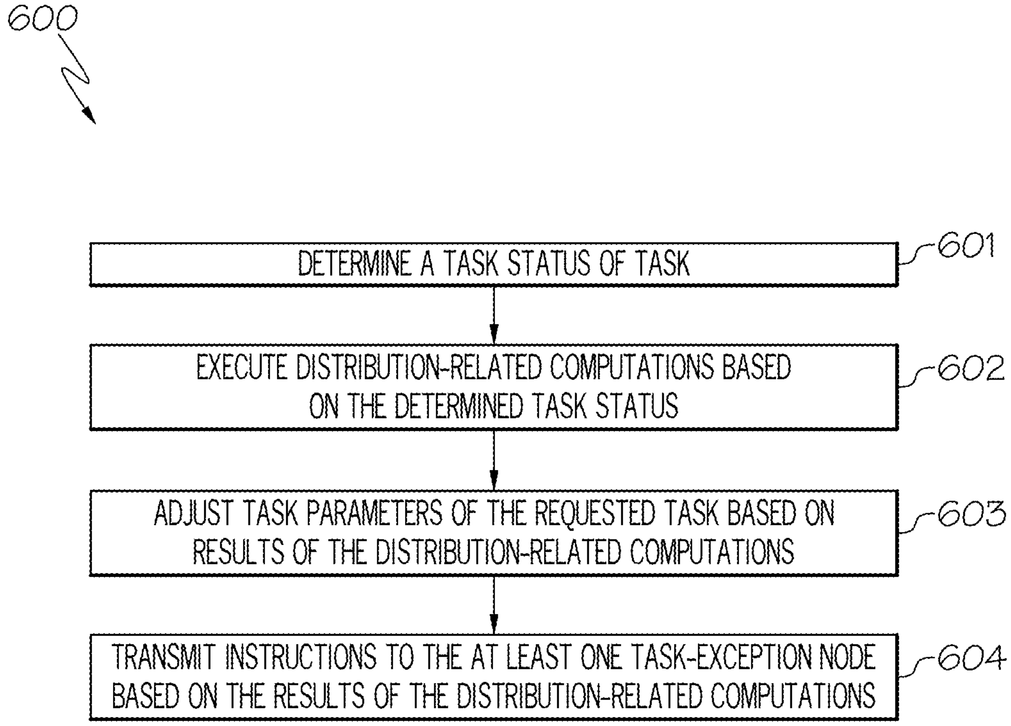

FIG. 7 is a method of updating task parameters of a task being processed by the distribution computer network of FIG. 1, according to at least one aspect of the present disclosure.

Figure 8:
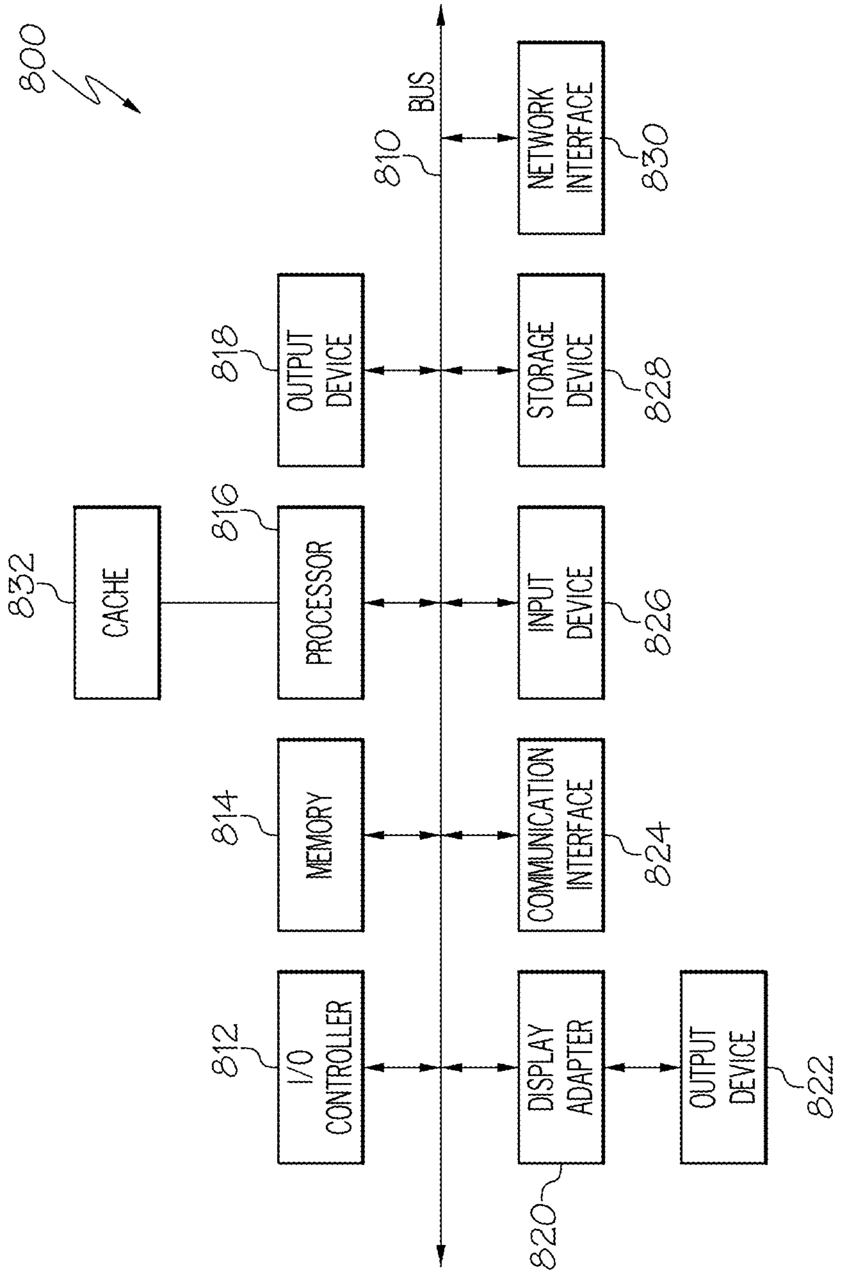

FIG. 8 is a block diagram of a computer apparatus with data processing subsystems or components, according to at least one aspect of the present disclosure.

Figure 9:
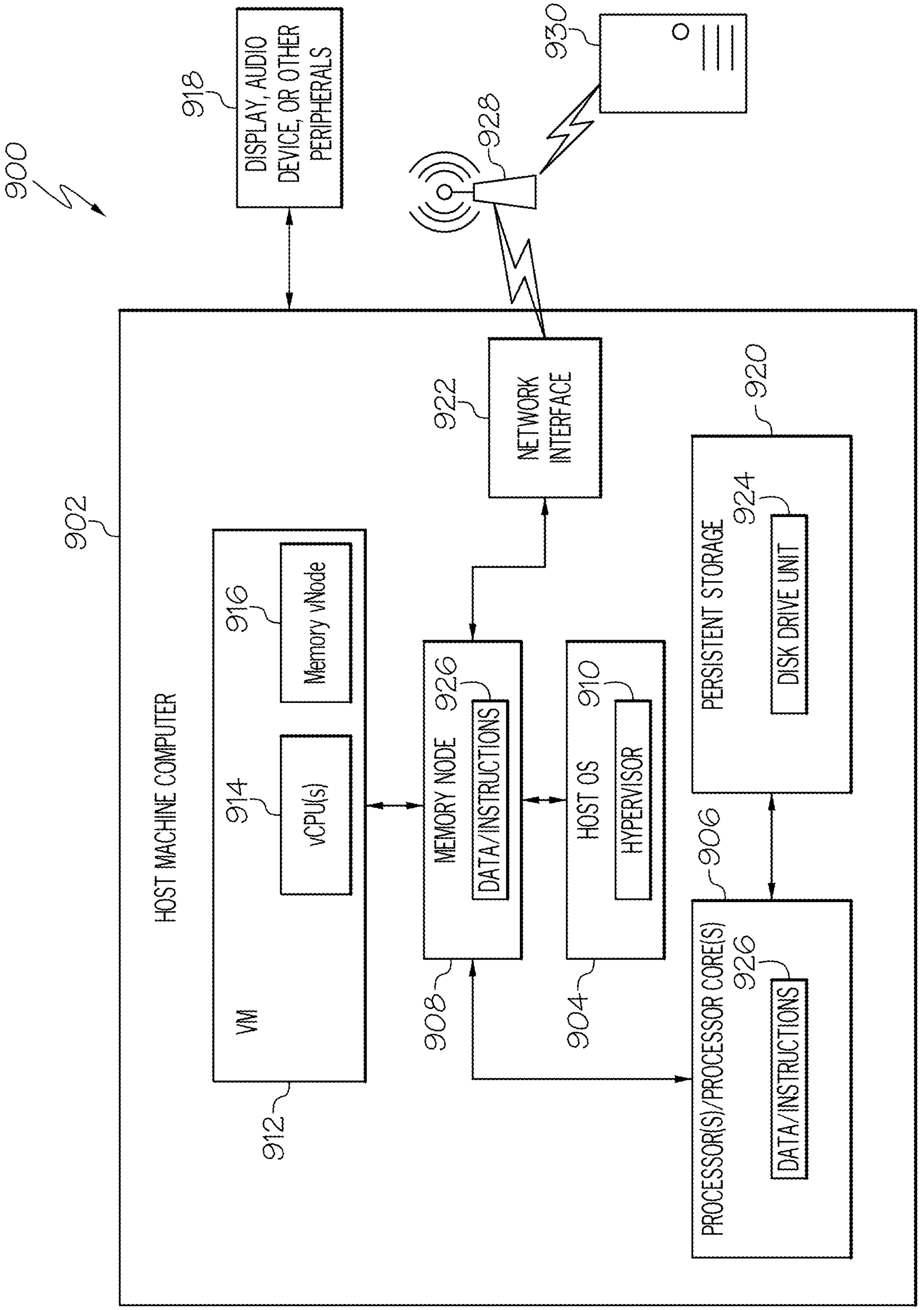

FIG. 9 is a diagrammatic representation of an example computer system that includes a host machine within which a set of instructions to perform any one or more of the methodologies discussed herein may be executed, according to at least one aspect of the present disclosure.

DESCRIPTION

The following disclosure may provide exemplary systems, devices, and methods for conducting transactions and related activities. Although reference may be made to such transactions in the examples provided below, aspects are not so limited. That is, the systems, methods, and devices may be utilized for any suitable purpose.

In various aspects, as illustrated in FIG. 1, the present disclosure describes a distribution computer network 10. The distribution computer network 10 includes a plurality of computer nodes 20 that run software with distinct data parameters. At least one of the computer nodes 20 is configured as an orchestration node 21. Some of the remaining computer nodes 20 are configured as task-oriented, or specialized, nodes 22. Additionally, or alternatively, some of the remaining computer nodes 20 are configured as task-exception nodes 23.

The orchestration nodes 21 are to receive instruction data from one or more user interfaces 41. Additionally, or alternatively, the orchestration nodes 21 may receive instruction data, which can be in the form of communication data and/or interaction data, from other computer nodes 20. The instruction data may include tasks and/or tasks may be inferred from the instruction data. Upon receiving the instruction data, and based on a set of extracted task parameters, the orchestration nodes 21 coordinate operation of the task-oriented nodes 22 in the distribution computer network 10 to execute the task. The distribution computer network 10 further includes a rules database 30 accessible by the computer nodes 20. The rules database 30 includes rules modifiable by the orchestration node 21 to direct changes in the operation of at least one of the task-oriented nodes 22. The changes can be based on change in task parameters, changes in tasks, and/or changes in interaction data being processed by the computer nodes 20.

The distribution computer network 10 may be a distributed computing system that uses the computer nodes 20. The computer nodes 20 can be interconnected via communication links. The distribution computer network 10 may be implemented using any appropriate network, including an intranet, the Internet, a cellular network, a local area network or any other such network or combination thereof. The computer nodes 20 can be any computer or group of computers that can operate within the distribution computer network 10.

A rules database 30 serves as a central repository for various operational policies and protocols that govern the distribution computer network 10. The rules database 30 is crucial for maintaining an orderly flow of data and ensuring consistent interactions among the computer nodes 20 as well as between these nodes and external entities 40. Further, the rules database 30 includes a comprehensive collection of protocols, ranging from security measures to data handling procedures, which are essential for the network's integrity and efficiency. The rules database 30 is not only accessible by all computer nodes 20 for reference and execution but also allows for dynamic updates by the orchestration node 21, which empowers the orchestration node 21 to implement changes in the operational flow of the task-oriented nodes 22 to align the distribution computer network 10 with changing tasks and objectives.

A data lake 60 defines a centralized repository designed to store, process, and secure large amounts of structured, semi-structured, and unstructured data based on historical and present interactions with the external entities 40. The data lake 60 may permit data storage in its native format, without requiring prior structuring, for example.

Various data types, including structured (e.g., relational databases), semi-structured (e.g., JSON or XML), and unstructured (e.g., text documents or images) data can be stored by the data lake 60. In some respects, the datasets of the data lake 60 may include interaction data relevant to inventory, suppliers, customers, products, purchase orders (PO), and/or products required by customers for their projects, projects information etc.

In some respects, the data lake 60 may perform analytics directly on the data stored therein. The analytics may include visualization analytics, big data processing analytics, and machine learning analytics, for example.

An analytics engine 50 is utilized by the distribution computer network 10 to detect and address exceptions, changes, and/or irregularities based on interaction data processed by the computer nodes 20, the rules stored in the rules database 30, and/or datasets sored the data lake 60. The analytics engine 50 interacts with the external entities 40 through dedicated task-exception nodes 23. The task-exception nodes 23 can be coordinated by the orchestration nodes 21. Additionally, or alternatively, the analytics engine 50 may interact with the external entities 40 through the task-oriented nodes 22.

The external entities 40 can be of the same type or different types. As illustrated in FIG. 1, the task-oriented nodes 22 utilize a front-end interface 43 for interactions with the external entities 40. Alternatively, some or all the task-oriented nodes 22 may directly interact with the external entities 40 without a front-end interface 43. The front-end interface 43 may filter and/or streamline interaction data from and/or to the external entities 40.

In some respects, the external entities 40 encompass a diverse array of stakeholders such as suppliers and customers/buyers that interact with dedicated subsets of the task-oriented nodes 22, for example. The orchestration nodes 21 may assign a first subset of the task-oriented nodes to processing interaction data associated with suppliers and assign a second subset of the task-oriented nodes to processing interaction data associated with the customers/buyers, for example. This strategic assignment ensures that each subset is finely tuned to the nuances of its corresponding external entity, thereby enhancing the quality and efficiency of data processing.

To further bolster data integrity and security, the data lake 60 serves as a secure repository, segregating supplier and customer/buyer interaction data into discrete datasets. For example, the data lake 60 may store supplier interaction data and the customer/buyer interaction data in separate datasets selectively accessible by corresponding subsets of the task-oriented data. Each dataset is curated to be exclusively accessible by its respective subset of task-oriented nodes 22. This granular level of access control prevents the intermingling of sensitive interaction data, which safeguards against potential security breaches. Moreover, this architecture facilitates a robust data governance framework that not only preserves the confidentiality of stakeholder interactions but also enables the distribution computer network 10 to adapt to changing data privacy regulations and compliance requirements.

The orchestration node 21 may seamlessly access and synergize the datasets associated with suppliers and with customers/buyers. The orchestration node 21 may access both datasets and may coordinate the first and second subsets of task-oriented nodes 22 based on the combined interaction data in the datasets to enhance collaborative processing and decision-making. Accordingly, the orchestration node 21 is adept at discerning the nuanced needs of each subset, selectively disseminating pertinent interaction data from otherwise inaccessible datasets to facilitate specific processing tasks.

The shared interaction data can be filtered to remove confidential information while still permitting the first and/or second subsets of task-oriented nodes 22 to perform an assigned task. This ensures that while the first and/or second subsets of task-oriented nodes 22 are fully equipped to execute their designated tasks, the integrity and privacy of the interaction data are uncompromised.

The analytics engine 50 may utilize datasets, including inventory levels, purchase orders, and sales orders, all securely housed within the data lake 60 for computations related to status of various products in inventory which are required by customers. The status computations can be related to products availability in inventory, delay from suppliers, and/or expedited requests. Furthermore, the analytics engine 50 may add, remove, or modify, rules in the rules database based on results of the computations. Based on the insights gleaned from its computations, the analytics engine 50 can introduce new rules, eliminate outdated ones, or modify existing protocols to better align with the current state of inventory and supply chain dynamics.

FIG. 2 illustrates a network architecture 100 for use with the distribution computer network 10. The network architecture 100 includes an orchestration node 21 that coordinates several task-oriented nodes 22 (e.g., $\text{Nodes}_{1-n}$) to process interaction data associated with several external entities 40 ($\text{External Entities}_{1-n}$). The orchestration node 21 may assign different tasks to different task-oriented nodes 22 based on distinct processing parameters of the task-oriented nodes 22 and/or the task parameters.

The orchestration node 21 may assign multiple task-oriented nodes 22 to a single task or assign multiple tasks to a single task-oriented node 22. The task-oriented nodes 22 can be pre-programmed with distinct processing parameters that are selectively suited to perform certain tasks or can be programmed based on, and after, the task assignments. The orchestration node 21 may assign different task-oriented nodes 22 to process different types of interaction data. The orchestration node 21 may assign a subset of the task-oriented nodes 22 to process a first type of interaction data and assign another subset of the task-oriented nodes 22 to process a second type of interaction data, different from the first type, for example.

The orchestration node 21 may assign different task-oriented nodes 22 to process interaction data associated with different types of external entities. The orchestration node 21 may assign a subset of the task-oriented nodes 22 to process interaction data associated with a type of external entities and assign another subset of the task-oriented nodes 22 to process interaction data associated with another type of external entities.

FIG. 3 illustrates an alternative network architecture 200 for use with the distribution computer network 10. Separate orchestration nodes 221, 221' coordinate different task-oriented nodes 222, 222' that are configured to process different types of interaction data from different types of external entities 40. The network architecture 200 presents an orchestration hierarchy where an orchestration node 221" is configured to coordinate the orchestration nodes 221, 221'. Alternatively, the orchestration nodes 221, 221' may directly coordinate with each other.

FIG. 4 illustrates a network architecture 300 for use with the distribution computer network 10. The network architecture 300 introduces a security/privacy layer to prevent task-oriented nodes from accessing interaction data beyond their assignments. As illustrated in FIG. 4, a data lake 360 may include dedicated datasets 361, 362 that are selectively accessible by the task-oriented nodes 322, 322'. The dataset 361 stores interaction data accessible by the task-oriented nodes 322 that is assigned by orchestration node 321 to process such interaction data. The dataset 361, however, is not accessible by the task-oriented nodes 322'. Similarly, the dataset 362 stores interaction data accessible by the task-oriented nodes 322', but not the task-oriented nodes 322. This approach permits assignment of the task-oriented nodes to process different interaction data without comingling of the data or risking a security breach.

The datasets 361, 362 may be generated and maintained by the orchestration node 321 and/or the task-oriented nodes 322, 322', for example, and may include historical and/or present interaction data. The orchestration node 321 is permitted to access both datasets 361, 362, and may selectively share relevant interaction data between the datasets 361, 362 such as, for example, in situations where the tasks being performed by the task-oriented nodes 322, 322' require interaction data sharing.

The computer nodes 20 of the distribution computer network 10 may comprise large language models (LLM) with separate, or shared, datasets stored in the data lake 60. The task-oriented nodes 22 can be configured as non-cognitive artificial intelligence (AI) models, and the orchestration nodes 21 can be configured as cognitive AI models that coordinate the non-cognitive AI models, for example. The datasets may include historical and/or present interaction data such as, for example, inputs/observations regarding interactions with external entities 40 and previously taking decisions and/or actions by the computer nodes 20, for example.

In some aspects, the AI models comprise a long-term memory defining a knowledge base, and a working memory to interact with the long-term memory. The working memory receives inputs and observations from external entities 40, and outputs actions based on the inputs and observations. The AI models can be configured to access separate dataset containing domain specific knowledge based on their configurations. The AI models can also be trained with specific skills sets which are collections of tools/functions e.g. for executing different codes for files handling, sending emails, reading saved emails, and the like.

FIG. 5 is a method 400 for processing interaction data. The method 400 may be executed by the distribution computer network 10, and includes configuring 401 a subset of the computer nodes 20 as the orchestration nodes 21. The method 400 further includes receiving 402 instruction data to perform a task. The instruction data can be received through one or more user interfaces 41, and/or the front-end interface 43. Additionally, or alternatively, the instruction data may be received from other orchestrations nodes 21. Based on the instruction data, one or more of the orchestration nodes 21 extract 403 task parameters associated with the task from a database such as, for example, the rules database 30 (FIG. 1).

Additionally, or alternatively, the orchestration nodes 21 may infer a task to be performed. For example, the orchestration nodes 21 may analyze instruction data from one or more sources (e.g., orchestration nodes 21, external entities 44, user interfaces 41), and infer a task based on the received instruction data. The received instruction data can include communications and/or interactions with the one or more sources. In one aspect, an orchestration node 21 may receive a request for performing a particular task through the front-end interface 43 and may infer a secondary task based on the requested task. The orchestration node 21 may then assign the requested task and/or the inferred task to one or more of the task-oriented nodes 22.

The method 400 further includes configuring 404 another subset of the computer nodes 20 to run as task-oriented nodes 22 with distinct data processing parameters based on the extracted task parameters. The orchestration node 21 can be configured to select, or configure, task-oriented nodes 22 based on the extracted task parameters. In addition, the method 400 further includes coordinating 405, by the orchestration node 21, operation of the task-oriented nodes 22 based on distinct data processing parameters of the task-oriented nodes 22 to execute the assigned task.

FIG. 6 illustrates a method 500 for coordinating, by an orchestration node (e.g., orchestration node 21, 221, 221', 221", 321), a plurality of task-oriented nodes (e.g., task-oriented node 22, 222, 222', 322, 322') to execute a task. The method 500 may be executed by the distribution computer network 10 in combination with, or separate from, one or more portions of the method 400. The method 500 includes monitoring 501 the computer nodes. In one aspect, monitoring 501 the computer nodes comprise monitoring interaction data processing by the task-oriented nodes based on task assignments by the orchestration nodes.

The method 500 further includes detecting 502 an interaction data processing condition. The detected condition may be an increase in data traffic beyond a predetermined capacity threshold associated with one or more of the task-oriented nodes. Alternatively, the detected condition may be a completion of a task assigned to one or more of the task-oriented nodes or an interruption in the operation of one or more of the task-oriented nodes, for example. Additionally, or alternatively, the detected condition may include changes in the operation of one or more of the task-oriented nodes, where the changes are based on change in task parameters, changes in tasks, and/or changes in interaction data being processed by the computer nodes 20.

The method 500 further includes adjusting 503 operation of at least one of the task-oriented nodes based on the detected condition. For example, the orchestration node 21 may selectively activate, reactivate, or reset at least one of the task-oriented nodes 22. The rules database 30 includes rules modifiable by the orchestration node 21 to direct changes in the operation of at least one of the task-oriented nodes 22.

FIG. 7 illustrates a method 600 for processing changes, exceptions, and/or irregularities in task parameters of tasks being executed by the distribution computer network 10. The method 600 can be executed separately, or in combination with one or more portions of the method 400 and/or one or more portions of the method 500. The method 600 includes determining 601, by the analytics engine 50 of the distribution computer network 10, a task status of the task. The method 600 further includes executing 602 distribution-related computations based on the determined task status, adjusting 603 the task parameters based on results of the distribution-related computations, and transmitting 604 instruction data to the at least one task-exception node 23 based on the results of the distribution-related computations.

The determination of the task status can be based on at least one of the rules database 30, the external entities 40, and/or the data lake 60. In one aspect, the data lake 60 includes separate datasets storing interaction data processed by subsets of task-oriented nodes with different data processing parameters and/or different task assignments. The analytic engine 50 may determine the task status by analyzing the interaction data in the separate dataset.

Additionally, or alternatively, the analytics engine 50 may execute at least one algorithm based on information from at least one of the rules database 30 or the data lake 60 to generate updates regarding at least one of a task status, information needed to complete a task, or changes in the instruction data. The updates can be shared with the computer nodes 20, external entities 44, and/or any internal users.

The computer nodes and/or the analytics engines described herein may have a local data collection system deployed and may use machine learning to enable derivation-based learning outcomes. The nodes and/or the analytics engine may learn from and make decisions on a set of data (including data provided by the various sensors), by making data-driven predictions and adapting according to the set of data. In embodiments, machine learning may involve performing a plurality of machine learning tasks by the nodes and/or the analytics engine, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

FIG. 8 is a block diagram of a computer apparatus 800 with data processing subsystems or components, according to at least one aspect of the present disclosure. The computer apparatus 800 is representative of a computer for executing the functionalities described above in connection with FIGS. 1-7. The subsystems shown in FIG. 8 are interconnected via a system bus 810. Additional subsystems such as a printer 818, keyboard 826, fixed disk 828 (or other memory comprising computer readable media), monitor 822, which is coupled to a display adapter 820, and others are shown. Peripherals and input/output (I/O) devices, which couple to an I/O controller 812 (which can be a processor or other suitable controller), can be connected to the computer system by any number of means known in the art, such as a serial port 824. For example, the serial port 824 or external interface 830 can be used to connect the computer apparatus to a wide area network such as the Internet, a mouse input device, or a scanner. The interconnection via system bus allows the central processor 816 to communicate with each subsystem and to control the execution of instructions from system memory 814 or the fixed disk 828, as well as the exchange of information between subsystems. The system memory 814 and/or the fixed disk 828 may embody a computer readable medium.

FIG. 9 is a diagrammatic representation of an example computer system 900 that includes a host machine 902 within which a set of instructions to perform any one or more of the methodologies discussed herein may be executed, according to at least one aspect of the present disclosure. The computer system 900 is representative of the gateway 404 or mesh network backend 408 shown in FIG. 4 and can be employed for executing the functionalities described above in connection with FIGS. 1-7, for example. In various aspects, the host machine 902 operates as a standalone device or may be connected (e.g., networked) to other machines. In a networked deployment, the host machine 902 may operate in the capacity of a server or a client machine in a server-client network environment, or as a peer machine in a peer-to-peer (or distributed) network environment. The host machine 902 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 900 includes the host machine 902, running a host operating system (OS) 904 on a processor or multiple processor(s)/processor core(s) 906 (e.g., a central processing unit (CPU), a graphics processing unit (GPU), or both), and various memory nodes 908. The host OS 904 may include a hypervisor 910 which is able to control the functions and/or communicate with a virtual machine ("VM") 912 running on machine readable media. The VM 912 also may include a virtual CPU or vCPU 914. The memory nodes 908 may be linked or pinned to virtual memory nodes or vNodes 916. When the memory node 908 is linked or pinned to a corresponding vNode 916, then data may be mapped directly from the memory nodes 908 to the corresponding vNode 916.

All the various components shown in host machine 902 may be connected with and to each other or communicate to each other via a bus (not shown) or via other coupling or communication channels or mechanisms. The host machine 902 may further include a video display, audio device or other peripherals 918 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 920 (also referred to as disk drive unit), and a network interface device 922. The host machine 902 may further include a data encryption module (not shown) to encrypt data. The components provided in the host machine 902 are those typically found in computer systems that may be suitable for use with aspects of the present disclosure and are intended to represent a broad category of such computer components that are known in the art. Thus, the system 900 can be a server, minicomputer, mainframe computer, or any other computer system. The computer may also include different bus configurations, networked platforms, multiprocessor platforms, and the like. Various operating systems may be used including UNIX, LINUX, WINDOWS, QNX ANDROID, IOS, CHROME, TIZEN, and other suitable operating systems.

The disk drive unit 924 also may be a Solid-state Drive (SSD), a hard disk drive (HDD) or other includes a computer or machine-readable medium on which is stored one or more sets of instructions and data structures (e.g., data/instructions 926) embodying or utilizing any one or more of the methodologies or functions described herein. The data/instructions 926 also may reside, completely or at least partially, within the main memory node 908 and/or within the processor(s) 906 during execution thereof by the host machine 902. The data/instructions 926 may further be transmitted or received over a network 928 via the network interface device 922 utilizing any one of several well-known transfer protocols (e.g., Hyper Text Transfer Protocol (HTTP)).

The processor(s) 906 and memory nodes 908 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 902 and that causes the host machine 902 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 902, with each server 930 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the devices and methods disclosed herein, according to various aspects of the present disclosure, are provided below in the following embodiments. An aspect of the devices and methods may include any one or more than one of, and any combination of, the embodiments described below.

In a first embodiment, the present disclosure provides a distribution computer network comprising a plurality of computer nodes, each configured to run a software with distinct data processing parameters, wherein at least one of the computer nodes being configured as an orchestration node and the remaining computer nodes being configured as task-oriented nodes, the orchestration node being configured, upon receiving instructions to perform a requested task, and based on a set of extracted task parameters, to coordinate operation of the remaining computer nodes in the distribution computer network to execute the requested task; and a rules database accessible by the computer nodes, the rules database comprising rules modifiable by the orchestration node to direct changes in the operation of at least one of the task-oriented nodes based on the requested task.

Additionally, the first embodiment further comprises a data lake comprising datasets accessible by the orchestration node; further comprises an analytics engine configured to execute at least one algorithm based on information from at least one of the rules database or the data lake to generate updates regarding at least one of a task status; a requirement for a task completion; or changes in the instruction data; or further comprises at least one task-exception node, and wherein the analytics engine is further configured to: determine a task status of the requested task; execute distribution-related computations based on the determined task status; adjust the task parameters based on results of the distribution-related computations; and transmit instructions to the at least one task-exception node based on the results of the distribution-related computations; or any combinations thereof. The task-oriented nodes of the first embodiment may further comprise subsets of task-oriented nodes with different data processing parameters, wherein the data lake comprises separate datasets storing interaction data processed by the subsets of task-oriented nodes, and wherein the analytics engine is configured to determine the task status based on the interaction data.

Alternatively, the orchestration node of the first embodiment comprises cognitive artificial intelligence (AI) agents; wherein the task-oriented nodes comprise non-cognitive AI agents. Alternatively, the non-cognitive AI agents and the cognitive AI agents are configured to utilize large language models; or any combination thereof.

Alternatively, the orchestration node is configured to selectively activate, reactivate, or reset at least one of the task-oriented nodes to execute the requested task.

In a second embodiment, the present disclosure provides a method executable by a distribution computer network with computer nodes, the method comprising: configuring one of the computer nodes as an orchestration node; receiving instructions to perform a requested task; extracting task parameters based on the requested task; configuring the remaining computer nodes as task-oriented nodes with distinct data processing parameters based on the task parameters; and coordinating, by the orchestration node, operation of the task-oriented nodes to execute the requested task.

Additionally, the second embodiment further comprises monitoring, by the orchestration node, the task-oriented nodes; detecting, by the orchestration nodes, a data processing condition in at least one of the task-oriented nodes; and adjusting, by the orchestration nodes, the operation of at least one of the task-oriented nodes based on the detected data processing condition; or the data processing condition comprises a change in data traffic associated with at least one of the task-oriented nodes; or any combination thereof.

Alternatively, the second embodiment further comprises modifying, by the orchestration node, a rules database accessible by the task-oriented nodes to direct a change in the operation of at least one of the task-oriented nodes; or wherein the change comprises activating, reactivating, or resetting at least one of the task-oriented node; or any combination thereof.

Alternatively, the second embodiment further comprises determining, by an analytics engine of the distribution computer network, a task status of the requested task; executing, by the analytics engine, distribution-related computations based on the determined task status; adjusting, by the analytics engine, the task parameters based on results of the distribution-related computations; and transmitting, by the analytics engine, instructions to at least one task-exception node based on results of the distribution-related computations; or further comprises configuring the computer nodes for selective access of separate datasets in a data lake based on the data processing parameters of the task-oriented nodes; or any combination thereof.

In a third embodiment, the present disclosure provides a distribution computer network comprising computer nodes each configured to run a software with distinct data processing parameters, the computer nodes comprising first specialized nodes configured to process a first data type based on interactions with a first external data source; second specialized nodes configured to process a second data type based on interactions with a second external data source; and an orchestration node configured, upon receiving instructions to perform a requested task, and based on a set of extracted task parameters, to coordinate operation of the first specialized nodes and the second specialized nodes to execute the requested task; and a rules database accessible by the computer nodes, the rules database comprising rules modifiable by the orchestration node to direct changes in the operation of at least one of the first specialized nodes or the second specialized nodes based on the requested task.

Additionally, the third embodiment, wherein the orchestration node comprises a cognitive artificial intelligence (AI) agent; or wherein the specialized nodes comprise non-cognitive AI agents; or any combination thereof.

Alternatively, the third embodiment further comprises a data lake comprising a first dataset storing first interaction data of the first data type, wherein the first dataset is accessible by the orchestration node and the first specialized nodes and inaccessibly by the second specialized nodes; and a second dataset storing second interaction data of the second data type, wherein the second dataset is accessible by the orchestration node and the second specialized nodes and inaccessibly by the first specialized nodes.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer-readable medium, such as RAM, ROM, a magnetic medium such as a hard-drive or a floppy disk, or an optical medium such as a CD-ROM. Any such computer-readable medium may reside on or within a single computational apparatus and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer-readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively, or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively, or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively, or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A computer-implemented method executable by a distribution computer network with computer nodes, the method comprising:

configuring one of the computer nodes as an orchestration node;

receiving, via a front-end interface in communication with the orchestration node, interaction data from at least one external entity, the interaction data including instruction data to perform a task, wherein the interaction data comprises a plurality of interaction data types corresponding to interactions with a plurality of external entities, wherein the interaction data types comprises at least one of supplier interaction data, customer or buyer interaction data, inventory data, product data, purchase-order data, sales-order data, product-availability data, supplier-delay data, expedited-request data, or project-information data;

extracting, by the orchestration node, from a rules database accessible by the computer nodes, task parameters associated with the task;

configuring the remaining computer nodes as task-oriented nodes with distinct data processing parameters based on the task parameters;

storing, in a data lake, datasets comprising the interaction data, the data lake being accessible by the orchestration node and selectively accessible by the task-oriented nodes based on the data processing parameters of the task-oriented nodes;

coordinating, by the orchestration node, operation of the task-oriented nodes to process the interaction data and execute the task;

monitoring, by the orchestration node, processing of the interaction data by the task-oriented nodes based on task assignments by the orchestration node;

detecting, by the orchestration node, a data processing condition in at least one of the task-oriented nodes, wherein the data processing condition comprises a change in data traffic associated with at least one of the task-oriented nodes, the change in data traffic being based on a change in the plurality of interaction data types processed by the at least one of the task-oriented nodes from at least one of the plurality of external entities;

adjusting, by the orchestration node, operation of at least one of the task-oriented nodes based on the detected data processing condition;

determining, by an analytics engine of the distribution computer network, a task status of the task based on the rules database and the interaction data stored in the data lake;

executing, by the analytics engine, distribution-related computations based on the determined task status;

adjusting, by the analytics engine, the task parameters based on results of the distribution-related computations; and modifying, by the orchestration node, the rules database to direct a change in the operation of at least one of the task-oriented nodes in processing the interaction data based on the detected processing condition, wherein the modifying is triggered by at least one of a change in the detected task parameters resulting from the distribution-related computations, or a change in the interaction data types being processed by the task-oriented nodes, and wherein the rules database comprises rules governing the operation of the task-oriented nodes in processing the plurality of interaction data types.

2. The computer-implemented method of claim 1, wherein the change in the operation of the at least one of the task-oriented nodes comprises activating, reactivating, or resetting at least one of the task-oriented nodes.

3. The computer-implemented method of claim 1, further comprising:

transmitting, by the analytics engine, instruction data to at least one task-exception node based on results of the distribution-related computations.

4. The computer-implemented method of claim 1, further comprising:

configuring the computer nodes for selective access of separate datasets in a data lake based on the data processing parameters of the task-oriented nodes, wherein configuring the computer nodes for selective access comprises:

restricting access to a first dataset storing first interaction data to a first subset of the task-oriented nodes;

restricting access to a second dataset storing second interaction data to a second subset of the task-oriented nodes; and permitting the orchestration node to access both the first dataset and the second dataset to coordinate processing of the first interaction data and the second interaction data.

5. A distribution computer network, comprising:

a plurality of computer nodes interconnected via communication links, each computer node configured to run a software with distinct data processing parameters, wherein at least one of the computer nodes being configured as an orchestration node and at least another of the computer nodes being configured as a task-oriented node, the orchestration node being configured, upon receiving instruction data comprising interaction data from at least one external entity to perform a task, and based on a set of extracted task parameters, to coordinate operation of the task-oriented node in the distribution computer network to process the interaction data and execute the task, wherein the interaction data comprises a plurality of interaction data types corresponding to interactions with a plurality of external entities, wherein the interaction data types comprises at least one of supplier interaction data, customer or buyer interaction data, inventory data, product data, purchase-order data, sales-order data, product-availability data, supplier-delay data, expedited-request data, or project-information data, and wherein the orchestration node is further configured to detect a data processing condition in at least one of the task-oriented nodes, wherein the data processing condition comprises a change in data traffic associated with at least one of the task-oriented nodes, the change in data traffic being based on a change in the plurality of interaction data types processed by the at least one of the task-oriented nodes from at least one of the plurality of external entities, and to adjust operation of at least one of the task-oriented nodes based on the detected data processing condition;

a rules database accessible by the computer nodes, the rules database comprising rules executed by the task-oriented node in processing the interaction data and modifiable by the orchestration node to direct changes in the operation of at least one of the task-oriented nodes based on the task, wherein the modifying is triggered by at least one of a change in detected task parameters resulting from distribution-related computations, or a change in the interaction data types being processed by the task-oriented nodes, and wherein the rules database comprises rules governing the operation of the task-oriented nodes in processing the plurality of interaction data types;

a data lake comprising datasets storing interaction data accessible by the orchestration node and selectively accessible by the task-oriented nodes based on the data processing parameters of the task-oriented nodes; and an analytics engine configured to determine a task status of the task based on the rules database and the interaction data stored in the data lake, to execute distribution-related computations based on the determined task status, to adjust the task parameters based on results of the distribution-related computations, and to execute at least one algorithm based on information from at least one of the rules database or the data lake to generate updates regarding at least one of:

a task status;

a requirement for a task completion; or changes in the instruction data.

6. The distribution computer network of claim 5, wherein the analytics engine is further configured to:

transmit instruction data to the at least one task-exception node based on the results of the distribution-related computations.

7. The distribution computer network of claim 6, wherein the task-oriented nodes comprise subsets of task-oriented nodes with different data processing parameters.

8. The distribution computer network of claim 7, wherein the data lake comprises separate datasets storing interaction data processed by the subsets of task-oriented nodes, and wherein the analytics engine is configured to determine the task status based on the interaction data.

9. The distribution computer network of claim 5, wherein the orchestration node comprises cognitive artificial intelligence (AI) agents, and wherein the task-oriented nodes comprise non-cognitive AI agents.

10. The distribution computer network of claim 9, wherein the orchestration node is configured to infer the task based on the instruction data.

11. The distribution computer network of claim 10, wherein the non-cognitive AI agents and the cognitive AI agents are configured to utilize large language models.

12. The distribution computer network of claim 5, wherein the orchestration node is configured to selectively activate, reactivate, or reset at least one of the task-oriented nodes to execute the task.

13. A distribution computer network, comprising:

computer nodes each configured to run a software with distinct data processing parameters, the computer nodes comprising:

first specialized nodes configured to process a first data type based on interactions with a first external data source;

second specialized nodes configured to process a second data type based on interactions with a second external data source; and an orchestration node configured, upon receiving instruction data comprising interaction data from at least one external entity to perform a task, and based on a set of extracted task parameters, to coordinate operation of the first specialized nodes and the second specialized nodes to execute the task, wherein the interaction data comprises a plurality of interaction data types corresponding to interactions with a plurality of external entities, wherein the interaction data types comprises at least one of supplier interaction data, customer or buyer interaction data, inventory data, product data, purchase-order data, sales-order data, product-availability data, supplier-delay data, expedited-request data, or project-information data, and wherein the orchestration node is further configured to detect a data processing condition in at least one of the first specialized nodes or the second specialized nodes, wherein the data processing condition comprises a change in data traffic associated with at least one of the first specialized nodes or the second specialized nodes, the change in data traffic being based on a change in the plurality of interaction data types processed by the at least one of the first specialized nodes or the second specialized nodes from at least one of the plurality of external entities, and to adjust operation of at least one of the first specialized nodes or the second specialized nodes based on the detected data processing condition;

a rules database accessible by the computer nodes, the rules database comprising rules modifiable by the orchestration node to direct changes in the operation of at least one of the first specialized nodes or the second specialized nodes based on the task, wherein the modifying is triggered by at least one of a change in detected task parameters resulting from distribution-related computations, or a change in the interaction data types being processed by the first specialized nodes or the second specialized nodes, and wherein the rules database comprises rules governing the operation of the first specialized nodes and the second specialized nodes in processing the plurality of interaction data types;

a data lake, comprising:

a first dataset storing first interaction data of the first data type, wherein the first dataset is accessible by the orchestration node and the first specialized nodes and is inaccessible by the second specialized nodes; and a second dataset storing second interaction data of the second data type, wherein the second dataset is accessible by the orchestration node and the second specialized nodes and is inaccessible by the first specialized nodes; and an analytics engine configured to determine a task status of the task based on the rules database and the interaction data stored in the data lake, to execute distribution-related computations based on the determined task status, to adjust the task parameters based on results of the distribution-related computations, and to execute at least one algorithm based on information from at least one of the rules database or the data lake to generate updates regarding at least one of:

a task status;

a requirement for a task completion; or changes in the instruction data.

14. The distribution computer network of claim 13, wherein the orchestration node comprises a cognitive artificial intelligence (AI) agent.

15. The distribution computer network of claim 14, wherein the specialized nodes comprise non-cognitive AI agents.

16. The distribution computer network of claim 13, wherein the orchestration node is configured to selectively activate, reactivate, or reset at least one of the specialized nodes to execute the task.

* * * * *